United States Patent Office 3,110,682
Patented Nov. 12, 1963

3,110,682
PROCESS FOR BREAKING PETROLEUM EMULSIONS
Melvin De Groote, University City, Mo., assignor to Petrolite Corporation, Wilmington, Del., a corporation of Delaware
No Drawing. Filed Mar. 15, 1957, Ser. No. 646,296
8 Claims. (Cl. 252—342)

This invention relates to processes or procedures particularly adapted for preventing, breaking or resolving emulsions of the water-in-oil type, and particularly petroleum emulsions.

The present application is a continuation-in-part of my co-pending application, Serial No. 425,944, filed April 27, 1954, now abandoned.

My invention provides an economical and rapid process for resolving petroleum emulsions of the water-in-oil type that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil, and relatively soft water on weak brines. Controlled emulsification and subsequent demulsification under the conditions just mentioned are of significant value in removing impurities, particularly inorganic salts, from pipeline oil.

Demulsification as contemplated in the present application includes the preventive step of co-mingling the demulsifier with the aqueous component which would or might subsequently become either phase of the emulsion in the absence of such precautionary measure. Similarly, such demulsifier may be mixed with the hydrocarbon component.

The resolution of emulsions and particularly oil field emulsions is well known. See for example U.S. Patent No. 2,552,528, dated May 15, 1951, to De Groote, with particular reference to column 23 thereof. See also "Treating Oil Field Emulsions," 2nd edition, published by the American Petroleum Institute.

The following is divided into five parts.

Part 1 is concerned with a description of the invention.

Part 2 is a description of oxyethylated polypropyleneglycols and the esters derived therefrom by use of dicarboxy acids.

Part 3 is concerned with three series of comparative demulsification tests on three different California emulsions, in which some demulsifiers of the present class were compared for effectiveness against certain other esters and against certain unesterified diols. The demulsifiers of the present class used in such tests were all derived from a commercially available polypropyleneglycol of approximately 2,000 molecular weight. The data are summarized in Tables II–IV of Part 3. That section also includes a description of additional comparative tests on a number of other California emulsions. The esters of the present class used in such additional tests were in some instances derived from a polypropyleneglycol of approximately 2,000 molecular weight and in some instances from such glycols of higher molecular weights. Such data are summarized in Tables V, VI and VII of Part 3.

Part 4 is concerned with similar comparative tests conducted on petroleum emulsions from areas other than California. The esters of the present class used in such tests were derived from polypropyleneglycols of approximately 2,000 molecular weight and higher.

Part 5 describes procedures from using the present class of esters for breaking petroleum emulsions.

PART 1

The demulsifying agents employed in the present process are acidic esters derived by reaction between dicarboxy acids having not more than 8 carbon atoms and oxyethylated polypropyleneglycols; said oxyethylated polypropyleneglycols being derived by the oxyethylation of polypropyleneglycols having molecular weights between about 2,000 and 6,000; the amount of ethylene oxide combined by the oxyethylation step being from about 15% to about 45% of the polypropyleneglycol by weight; the ratio of dicarboxy acid to such diol being within the range of ratios 2:1 and 5:4; the esterification reaction being carried substantially to completion at a temperature above the boiling point of water and below the pyrolytic point of the reactants and the reaction products. Any alkali present prior to esterification may be removed by conventional procedures.

The resolution of petroleum emulsions by use of polyesters derived from glycols and dicarboxy acids is well known. See, for example, U.S. Patent No. 2,562,878, dated August 7, 1951, to Blair.

It has now been found that, if polypropyleneglycols having molecular weights between about 2,000 and 6,000 are first reacted with ethylene oxide in such amount as will increase their molecular weights by about 15%–45%, and such glycols are then esterified with dicarboxy acids having not more than 8 carbon atoms, in the manner described in aforementioned Blair Patent No. 2,562,878, the resulting esters, particularly if they possess terminal carboxyl groups, are unusually effective demulsifying agents.

Such low-molal acids as succinic, maleic, diglycolic, phthalic, and their anhydrides and isomers, may be employed in this esterification. Other suitable acids include glutaric, adipic, pimelic, and suberic.

Oxyethylated polypropyleneglycols are available in the open market from at least one manufacturer. As to their manufacture, see U.S. Patent No. 2,674,619, dated April 6, 1954, to Lundsted. Polypropyleneglycols, particularly those having molecular weights between about 1,000 and 2,750, are commercially available from at least two manufacturers; and at least one manufacturer offers one product having a molecular weight of about 3,000 and another of about 4,000. Polypropyleneglycols having molecular weights in excess of 4,000 are available from manufacturers who specialize in the production of custom-made oxyalkylated products. Note, also, that the preparation of similar products is described in U.S. Patent No. 2,774,735, dated December 18, 1956, to Becher.

The preparation of esters from dicarboxy acids and glycols is described in aforementioned Blair Patent No. 2,562,878. Other patents describing esterification reactions involving polyols include U.S. Patent No. 2,679,516, dated May 25, 1954, to De Groote, and more particularly U.S. Patent No. 2,723,284, dated November 8, 1955, to De Groote. Note that both of these patents give data for removal of residual alkaline catalysts.

No claim is made here that the present products are boldly new compositions, although it is believed that they have not previously been described. It is believed, however, that there has been no previous suggestion that this specific class of esters shows markedly greater demulsifying power than do the somewhat comparable esters described in certain patents, e.g., those specifically disclosed in Blair No. 2,562,878. No claim is made here that the present products have marked utility for any purpose other than demulsification. They can be manufactured from commercially available starting materials, employing only well known procedures.

It is to be noted the present invention is limited to the use of dicarboxy acids having not over 8 carbon atoms. Acids of this type having a hydroxyl group may be employed. The only limitation is that the acids or products of reaction be stable under conditions of esterification.

Similarly, one can use tricarboxylic acids which meet the same requirement in regard to the number of carbon atoms as, for example, citric acid, aconitic acid, and the like. Similarly, at least one tetracarboxy acid, i.e., tetracarboxy butane, may be ued to yield demulsifying agents as good as and perhaps in some instances even better than the comparable products obtained by the use of dicarboxy acids.

Due to the unusual distance between the hydroxyl radicals even if cross-linking takes place with the tricarboxy acid or even a tetracarboxy acid the products so obtained are still solvent-soluble for the same reason that certain combinations produce soft polyester resins in comparison with hard polyester resins.

However, this invention as herein described is limited to the use of dicarboxy acids.

PART 2

The bulk of the literature on oxyalkylation deals with oxyethylation. The same procedures may be employed in oxypropylation, with such obvious modifications in operating procedures as may be necessary. As to oxyalkylation, see the brochure, "Ethylene Oxide Technical Bulletin 1956," issued by Jefferson Chemical Company, Inc., New York, New York. Note also the extensive bibliography it contains.

The glycols employed to produce my present reagents are described in Table I, in a form that will facilitate comparisons, and particularly the comparative tests shown in Parts 3 and 4 hereof. That table shows polypropyleneglycol starting materials of molecular weights between 1,600 and 6,000, designated by capital letters, from A through Y.

Note, however, that the esters whose use as demulsifiers is claimed herein must all be made from polypropyleneglycols of approximately 2,000 molecular weight minimum.

Commercially available polypropyleneglycols were preferably employed in preparing the oxyethylated derivatives of such glycols recited in Table I. Commercial polypropyleneglycol of molecular weight 4,000 was oxypropylated further, using conventional procedure, to produce polypropyleneglycols of molecular weights up to approximately 6,000. The oxyethylated derivatives of such glycols, prepared by introducing from about 15% to about 45% by weight of ethylene oxide, based on the starting glycol, are shown in Table I. The oxyethylation procedure is a conventional one. No effort is made to direct the addition of ethylene oxide solely to one terminal hydroxyl. Within working tolerances, therefore, the added oxide tends to distribute itself equally between the two terminal positions. The series of oxyethylated polypropyleneglycols so produced is designated herein by a capital letter followed by one or two digits, the letter being that representing the respective polypropyleneglycol starting material and the digits representing the weight percent of ethylene oxide introduced into such glycol.

The oxyethylated polypropyleneglycols are then reacted with dicarboxy acids having not more than 8 carbon atoms, such as maleic, diglycolic, adipic, etc., using molal ratios, acid-to-glycol, of 2:1, 3:2, 4:3, and 5:4. The esterification procedure is conventional. It is described in the previously mentioned patents. Esterification is carried substantially to completion, as judged by evolution of water or other suitable means. It is stopped short of the point where decomposition of the mass begins to occur.

For reasons which are well known, and which are discussed in Blair Patent No. 2,562,878, noted above, such products are not single compounds, but mixtures including monomers, polymers, or both. Whether the reaction product is a monomer, dimer, trimer, tetramer, pentamer or higher polymer, it is important that it contains free carboxyl radicals at both ends of the molecule.

Either diglycolic acid or maleic acid was used to prepare the reagents whose demulsifying performance is recorded in Parts 3 and 4 hereof, although any other dicarboxy acid having not over 8 carbon atoms might have been employed instead.

The esters used in the tests reported in Parts 3 and 4 are designated as follows: The oxyethylated polypropyleneglycol component of the ester is designated by a capital letter and two digits; then follows a lower-case letter, either "a" (for diglycolic acid) or "b" (for maleic acid); then follows two digits, representing the molal ratio of dicarboxy acid to glycol reacted. For example, "E20a21" designates the acidic ester made from polypropyleneglycol of molecular weight 2,000 which, after being oxyethylated using 20% of its weight of ethylene oxide, has been esterified with diglycolic acid, using a molal ratio of 2:1, acid-to-glycol. Such designations are clearly definitive of the acidic esters herein employed as demulsifiers.

The performance of esters made from glycols which were not oxyethylated before esterification will also be recited below, for purposes of comparison. Such esters are of the kind described in aforementioned Blair Patent No. 2,562,878. They are designated using the practice described above; wherefore the digits immediately following the capital letter in the designation will not appear. For example, Ea21 denotes the ester made from the polypropyleneglycol of molecular weight 1,600 and diglycolic acid, using a molal ratio of 2:1, acid-to-glycol.

It should be noted that the Blair patent specifically mentions polypropyleneglycols of molecular weights as high as 2,000 but it does not refer to the effectiveness of the products made from polypropyleneglycols whose molecular weights are greater than 2,000. Obviously, the minimum molecular weight of the herein employed glycols prior to esterification is 2,300.

It is not believed it is necessary to describe the details of manufacture. As stated elsewhere our preference is to use commercially available polypropyleneglycols which, by and large, are represented by the following molecular weights: 2,000, 2750, 3000, 3500 and 4,000.

More specifically, 2000 pounds of polypropylene glycol (2000 M.W.) is subjected to oxyalkylation in presence of a finely dispersed alkaline catalyst (caustic soda) at a comparatively low operating pressure, generally under 30 pounds per square inch. The amount of powdered caustic soda may vary from 3% to 5%. The amount of ethylene oxide added for reaction is 300 pounds. The temperature is held at less than 100° C. Addition of ethylene oxide is made slowly but employing equipment which permits instant reaction due to vigorous agitation. The final product is subject to treatment with hydrochloric acid as noted in the manner described in aforementioned U.S. Patents No. 2,679,516, and 2,723,284, so as to remove the alkali prior to esterification. The oxyethylated polypropyleneglycol has a molecular weight of approximately 2300; with the particular equipment used the time required to add the oxide was 10 hours. A product of this kind suitable for use in the present process can be obtained commercially from at least one source.

In the esterification the preferred acid is diglycolic acid. The amount used is about 12.5% by weight of the diol. Esterification is conducted in the manner described in the aforementioned Blair patent at temperatures approximating 190° C. and until there is no longer any evolution of water. The usual precautions against pyrolysis and degradation are taken in the esterification step. In subsequent tests the esters are limited to the two which are particularly preferred, to wit, diglycolic acid and maleic anhydride. These two acids were used to prepare the particular esters whose effectiveness is reported in subsequent tables. The particular esters employed in these tests used the acids and the glycol reactants in the molal proportions which had been found generally to shown the best results, viz., 2:1 and 3:2. Alkali is eliminated prior to all esterification steps.

In some instances using the same reactants esterification was continued at about 250° C., until substantially no more water of esterification was evolved. When acid anhydrides are used there is, of course, no evolution of water in producing the simple monomeric ester. However, in such instances where the ratio is less than 2 to 1 (2 parts of the anhydride to one of the glycol) obviously the carboxyl groups formed from the anhydride can then combine with additional glycol to form water.

In Table I there is listed a number of suitable oxyethylated polypropyleneglycols which are particularly advantageous for use as reactants in the present process. Some of them are available commercially from at least one source.

(1) *Polypropyleneglycols.*—These have been designated as noted above by capital letters, unaccompanied by either digits or other letters. For example, "E" represents the polypropyleneglycol of 2,000 molecular weight. (In some of the latter comparative tests below, the performance of the simple, non-oxyethylated polypropyleneglycol was not recorded because its effectiveness was so slight as to be insignificant.)

(2) *Oxyethylated polypropyleneglycols.*—These have been designated above by a capital letter, followed by one or more digits. They are the materials described in Lundsted Patent No. 2,674,619, and are known to be effective on some petroleum emulsions. For example "E7" designates the product obtained by reacting polypropyleneglycol of 2,000 molecular weight with 7% of its weight of ethylene oxide.

(3) *Esters of polypropyleneglycols.*—These are herein designated by a capital letter (identifying the parent polypropyleneglycol), followed by a lower-case or small letter (identifying the dicarboxy acid used), and then followed in turn by two digits (indicating the molal ratio, acid-to-glycol, used in preparing the ester). This is the class of reagent described in Blair Patent No. 2,562,878, for use in resolving petroleum emulsions.

(4) *Esters of oxyethylated polypropyleneglycols, the agents of the present invention.*—Expressed differently, the present reagents are esters, particularly acidic esters, of the class of oxyethylated polypropyleneglycols described in the above Lundsted patent. They are designated by a capital letter (identifying the starting polypropyleneglycol material), followed by one or more digits (representing the weight percent of ethylene oxide intro-

*Table I*

| Starting Polypropyleneglycol | | Polypropyleneglycol With 15% Added EtO | | Polypropyleneglycol With 20% Added EtO | | Polypropyleneglycol With 25% Added EtO | | Polypropyleneglycol With 30% Added EtO | | Polypropyleneglycol With 35% Added EtO | | Polypropyleneglycol With 40% Added EtO | | Polypropyleneglycol With 45% Added EtO | |
|---|---|---|---|---|---|---|---|---|---|---|---|---|---|---|---|
| Designation | Molecular Weight | Designation | Molecular Weight | Designation | Molecular Weight | Designation | Molecular Weight | Designation | Molecular Weight | Designation | Molecular Weight | Designation | Molecular Weight | Designation | Molecular Weight |
| A | 1,600 | A-15 | 1,840 | A-20 | 1,920 | A-25 | 2,000 | A-30 | 2,080 | A-35 | 2,160 | A-40 | 2,240 | A-45 | 2,320 |
| B | 1,700 | B-15 | 1,955 | B-20 | 2,040 | B-25 | 2,120 | B-30 | 2,210 | B-35 | 2,290 | B-40 | 2,380 | B-45 | 2,465 |
| C | 1,800 | C-15 | 2,070 | C-20 | 2,160 | C-25 | 2,245 | C-30 | 2,340 | C-35 | 2,430 | C-40 | 2,520 | C-45 | 2,605 |
| D | 1,900 | D-15 | 2,185 | D-20 | 2,280 | D-25 | 2,365 | D-30 | 2,470 | D-35 | 2,565 | D-40 | 2,660 | D-45 | 2,750 |
| E | 2,000 | E-15 | 2,300 | E-20 | 2,400 | E-25 | 2,500 | E-30 | 2,600 | E-35 | 2,700 | E-40 | 2,800 | E-45 | 2,900 |
| F | 2,100 | F-15 | 2,420 | F-20 | 2,520 | F-25 | 2,620 | F-30 | 2,730 | F-35 | 2,835 | F-40 | 2,940 | F-45 | 3,045 |
| G | 2,200 | G-15 | 2,530 | G-20 | 2,640 | G-25 | 2,745 | G-30 | 2,860 | G-35 | 2,975 | G-40 | 3,080 | G-45 | 3,190 |
| H | 2,300 | H-15 | 2,650 | H-20 | 2,760 | H-25 | 2,870 | H-30 | 2,895 | H-35 | 3,105 | H-40 | 3,220 | H-45 | 3,330 |
| I | 2,400 | I-15 | 2,760 | I-20 | 2,880 | I-25 | 3,000 | I-30 | 3,120 | I-35 | 3,240 | I-40 | 3,300 | I-45 | 3,475 |
| J | 2,500 | J-15 | 2,870 | J-20 | 3,000 | J-25 | 3,120 | J-30 | 3,245 | J-35 | 3,375 | J-40 | 3,500 | J-45 | 3,620 |
| K | 2,600 | K-15 | 2,990 | K-20 | 3,120 | K-25 | 3,250 | K-30 | 3,375 | K-35 | 3,510 | K-40 | 3,640 | K-45 | 3,770 |
| L | 2,700 | L-15 | 3,100 | L-20 | 3,240 | L-25 | 3,375 | L-30 | 3,505 | L-35 | 3,650 | L-40 | 3,780 | L-45 | 3,920 |
| M | 2,800 | M-15 | 3,280 | M-20 | 3,360 | M-25 | 3,500 | M-30 | 3,640 | M-35 | 3,780 | M-40 | 3,920 | M-45 | 4,070 |
| N | 2,900 | N-15 | 3,335 | N-20 | 3,480 | N-25 | 3,625 | N-30 | 3,775 | N-35 | 3,920 | N-40 | 4,060 | N-45 | 4,205 |
| O | 3,000 | O-15 | 3,450 | O-20 | 3,600 | O-25 | 3,750 | O-30 | 3,900 | O-35 | 4,050 | O-40 | 4,200 | O-45 | 4,350 |
| P | 3,250 | P-15 | 3,740 | P-20 | 3,900 | P-25 | 4,055 | P-30 | 4,225 | P-35 | 4,385 | P-40 | 4,550 | P-45 | 4,720 |
| Q | 3,500 | Q-15 | 4,025 | Q-20 | 4,200 | Q-25 | 4,395 | Q-30 | 4,550 | Q-35 | 4,725 | Q-40 | 4,900 | Q-45 | 5,075 |
| R | 3,750 | R-15 | 4,300 | R-20 | 4,500 | R-25 | 4,700 | R-30 | 4,810 | R-35 | 4,995 | R-40 | 5,230 | R-45 | 5,365 |
| S | 4,000 | S-15 | 4,600 | S-20 | 4,800 | S-25 | 5,000 | S-30 | 5,200 | S-35 | 5,400 | S-40 | 5,600 | S-45 | 5,800 |
| T | 4,250 | T-15 | 4,890 | T-20 | 5,130 | T-25 | 5,315 | T-30 | 5,525 | T-35 | 5,735 | T-40 | 5,950 | T-45 | 6,165 |
| U | 4,500 | U-15 | 5,175 | U-20 | 5,400 | U-25 | 5,625 | U-30 | 5,850 | U-35 | 6,075 | U-40 | 6,300 | U-45 | 6,560 |
| V | 5,000 | V-15 | 5,750 | V-20 | 6,000 | V-25 | 6,250 | V-30 | 6,500 | V-35 | 5,750 | V-40 | 7,000 | V-45 | 7,250 |
| W | 5,250 | W-15 | 6,035 | W-20 | 6,300 | W-25 | 6,565 | W-30 | 6,876 | W-35 | 6,085 | W-40 | 7,350 | W-45 | 7,620 |
| X | 5,750 | X-15 | 6,610 | X-20 | 6,900 | X-25 | 7,200 | X-30 | 7,410 | X-35 | 7,695 | X-40 | 7,980 | X-45 | 8,285 |
| Y | 6,000 | Y-15 | 6,900 | Y-20 | 7,200 | Y-25 | 7,500 | Y-30 | 7,800 | Y-35 | 8,100 | Y-40 | 8,400 | Y-45 | 8,700 |

PART 3

The high level of demulsifying effectiveness exhibited by the present reagents is quite unexpected, as is shown by a number of comparative tests described below. In most of these tests over three representative California oils, four classes of compositions were compared for effectiveness in resolving petroleum emulsions:

duced into such starting glycol), then followed by a lower-case letter (identifying the dicarboxy acid used), and finally followed by two digits (to indicate the molal ratio, acid-to-glycol).

The first comparison tests were made in an emulsion sample from the Sunset Beach field of California. When completely resolved, this emulsion separated 26% water. The test procedure was conventional. The reagents were introduced into respective equal-portion portions of the emulsion at a ratio of 1:10,000; the mixture of emulsion and reagent was agitated mechanically for 5 minutes at 130 shakes per minute; the bottles were then settled in a 100° F. bath; and water-separation readings were made after 1 hour and after 20 hours. Table II shows the results obtained. (In this table and elsewhere herein, "EtO" is used to represent ethylene oxide.)

Table II
RESULTS OF TESTS ON SUNSET BEACH, CALIFORNIA EMULSION

| Reagent Designation | Reagent Composition | Described by— | Water Separated in— | |
|---|---|---|---|---|
| | | | 1 hour, percent | 20 hours, percent |
| E | Polypropyleneglycol. | | Trace | 14 |
| E7 | Polypropyleneglycol plus 7% EtO. | Lundsted | 1 | 14 |
| E15 | Polypropyleneglycol plus 15% EtO. | do | 1 | 19 |
| E23 | Polypropyleneglycol plus 23% EtO. | do | 4 | 24 |
| E30 | Polypropyleneglycol plus 30% EtO. | do | 4 | 20 |
| Ea32 | Ester of E above | Blair | Trace | 12 |
| Eb21 | do | do | 2 | 14 |
| E7a32 | Ester of E7 above | Applicant | 3 | 14 |
| E7b21 | do | do | 5 | 24 |
| E15a32 | Ester of E15 above | do | 4 | 19 |
| E15b21 | do | do | 6 | 26 |
| E23a32 | Ester of E23 above | do | 2 | 19 |
| E23b21 | do | do | 10 | 26 |
| E30a32 | Ester of E30 above | do | 4 | 14 |
| E30b21 | do | do | 15 | 26 |

In examining the above data which is typical of a large number of other tests, it is obvious that esters of the kind described in Blair Patent 2,526,878 are better than the water-insoluble polypropyleneglycols from which they were prepared. In a general way, one can speculate that such esterification yields products having terminal hydrophile groups, for example, where a water-insoluble polypropyleneglycol is reacted with a water-soluble acid, yielding products with terminal hydrophilic groups. In a general way, the same thing happens in preparing the oxyethylated polypropyleneglycol of the class described in Lundsted Patent 2,674,619. Again, such products are better than the precursory polypropyleneglycol. Also, again one may look upon this procedure in a general way as introducing terminal hydrophilic segments. However, it will be noted in the compounds herein described, i.e., those obtained by esterification of the oxyethylated water-insoluble polypropyleneglycols, one adds some other factor not inherently present in either the above two classes and results in a demulsifying action which is generally faster and more complete in action. Indeed, in some ways it will be noted the products described in the aforementioned Blair patent showed rather little improvement over the polypropyleneglycol as such.

Previous reference has been made to a speculative examination as to the significance of terminal hydrophile groups. However, it is at once obvious that where polymers are obtained by the procedure of the aforementioned Blair Patent No. 2,526,878 there are also hydrophile segments introduced in the inside or internal structure by a linear polymer. The same applies in the products herein employed when polymers are formed as differentiated from dicarboxylated monomers. In numerous instances the polymers are better than the monomers. This applies in regard to both the products herein described and the products described in the above Blair patent. Thus, there is no simple explanation of the unusual effectiveness of the herein described demulsifying agents.

Attention is directed to the fact that the Blair patent is by no means limited to water insoluble polypropyleneglycol having a molecular weight of approximately 2,000 or thereabouts, and what is said herein in regard to such comparisions is based on this particular single specie of the Blair patent, since it is the closest analog, and not in comparison to other esters disclosed in said patent, which is concerned solely with demulsification.

Similar comparisons were made using a sample of petroleum emulsion taken from the Huntington Beach field of California. This second emulsion, on complete resolution, would separate 20% water. The results of this second set of comparative tests are set out in Table III below.

Table III
RESULTS OF TESTS ON HUNTINGTON BEACH, CALIFORNIA, EMULSION #1

| Reagent Designation | Reagent Composition | Described by— | Water Separated in— | |
|---|---|---|---|---|
| | | | 1 hour, percent | 20 hours, percent |
| E | Polypropyleneglycol. | | 0 | Trace |
| E7 | Polypropyleneglycol plus 7% EtO. | Lundsted | 0 | 0 |
| E15 | Polypropyleneglycol plus 15% EtO. | do | 0 | 0 |
| E23 | Polypropyleneglycol plus 23% EtO. | do | 0 | 6 |
| E30 | Polypropyleneglycol plus 30% EtO. | do | 6 | 12 |
| Ea32 | Ester of E above | Blair | 0 | 3 |
| Eb21 | do | do | 0 | 4 |
| E7a32 | Ester of E7 above | Applicant | 0 | 4 |
| E7b21 | do | do | 12 | 16 |
| E15a32 | Ester of E15 above | do | 0 | 6 |
| E15b21 | do | do | 16 | 20 |
| E23a32 | Ester of E23 above | do | Trace | 9 |
| E23b21 | do | do | 14 | 19 |
| E30a32 | Ester of E30 above | do | Trace | 9 |
| E30b21 | do | do | 13 | 18 |

Here again, the Blair-type esters of the polypropyleneglycol showed little superiority over the patent glycol. However, the present reagents are markedly better than the Lundsted-type oxyethylated polypropyleneglycols.

In a third series of comparative tests, a petroleum emulsion from a different well at Huntington Beach, California, was used. (There are different pools or zones in this field; and the oils and the emulsions produced by these two wells were not the same.) On complete resolution, this emulsion separated 26% water. The results of the third set of comparative tests are shown in Table IV below.

Table IV
RESULTS OF TESTS ON HUNTINGTON BEACH, CALIFORNIA, EMULSION #2

| Reagent Designation | Reagent Composition | Described by— | Water Separated in— | |
|---|---|---|---|---|
| | | | 1 hour, percent | 20 hours, percent |
| E | Polypropyleneglycol. | | Trace | 7 |
| E7 | Polypropyleneglycol plus 7% EtO. | Lundsted | Trace | 9 |
| E15 | Polypropyleneglycol plus 15% EtO. | do | 1 | 9 |
| E23 | Polypropyleneglycol plus 23% EtO. | do | 1 | 9 |
| E30 | Polypropyleneglycol plus 30% EtO. | do | 2 | 9 |
| Ea32 | Ester of E above | Blair | 0 | 9 |
| Eb21 | do | do | 0 | 10 |
| E7a32 | Ester of E7 above | Applicant | 0 | 12 |
| E7b21 | do | do | 2 | 10 |
| E15a32 | Ester of E15 above | do | 2 | 15 |
| E15b21 | do | do | Trace | 25 |
| E23a32 | Ester of E23 above | do | 1 | 20 |
| E23b21 | do | do | 1 | 27 |
| E30a32 | Ester of E30 above | do | 1 | 21 |
| E30b21 | do | do | 2 | 20 |
| E10a54 | Ester of E10 above | do | 0 | 8 |
| E10b54 | do | do | Trace | 19 |

It is again apparent that the Blair esters show no superiority over the starting polypropyleneglycol; and there would be no reason to suspect that esters of the present kind, prepared from oxyethylated polypropyleneglycols of the kind described by Lundsted would show such superiority. Note that ester of the present kind, prepared from polypropyleneglycols which have been subjected only to mild oxyethylation (E7 and E10) exhibit less effectiveness than esters prepared from, for example, E15, E23 and E30.

The California emulsions on which such comparative tests were conducted are not exceptional oil-field emulsions. Neither is the behavior of the present reagents on these emulsions unique. On the contrary, similar comparative tests have been made using emulsions from other oil fields in California, and also from oil fields in other areas, with similar results. The California emulsions used in such additional tests are listed in Table V following.

Additional comparative demulsification tests were conducted, using the California emulsions recited in Tables V, VI and VII.

In these additional tests, a number of the present class of reagents were compared for demulsifying effectiveness against the respective unesterified oxyethylated polypropyleneglycols (of the class described in the Lundsted patent mentioned earlier), and against the respective esters of the non-oxyethylated polypropyleneglycols (of the class described in the Blair patent mentioned earlier). In all such tests, of course, the representatives of the three classes of reagents were all tested in exactly the same manner; and the several portions of emulsion and reagent were all processed exactly the same in the test; for example, as to shaking time, settling time, and settling temperature.

This does not apply to the concentration used. In each case the minimum concentration, i.e., the highest ratio of emulsified oil to demulsifying agent, is used in testing or appraising the compounds of the present invention, i.e., esters of oxyethylated polypropyleneglycol. In some instances the same ratio was employed in examining the corresponding esters of polypropyleneglycol (non-oxyethylated) or the oxyethylated polypropyleneglycol without esterification. In other instances, however, in these two comparison classes an increased amount of the demulsifying agent was employed, i.e., the ratio of emulsified oil to demulsifying agent was decreased.

Table V is concerned with a description of the emulsified oils obtained from various oil fields in California.

Table VI shows the ratio at which the currently employed demulsifiers give pipeline oil (less than 3% B.S. & W.) under the same conditions as employed, in subsequent comparative tests, which appear in Table VI, at least in regard to the demulsifying agents of the present invention. In almost every case it did not hold for the other two classes of demulsifiers above noted.

In Table VII all numbers carrying the suffix AA represent compounds of the kind described in the present application and the results are identical with those recorded in Table VI. Those having the suffix BB represent the comparable products derived from the same dicarboxy acid and the same polypropyleneglycol prior to oxyethylation. These are the compounds of the above-mentioned Blair patent.

Those identified with the suffix CC are the precursory oxyethylated polypropyleneglycols and represent the products of the aforementioned Lundsted patent.

Note in the third column the demulsifiers employed are those which have been described previously, or their composition is identified by the designation itself as previously explained.

*Table V*

| Emulsion No. | State of— | Oil Field | Oil Company | Lease | Well | Percent Emulsion in Fluid from Well | Percent Free Water in Fluid from Well | Percent Water Obtained by Complete Demulsification |
|---|---|---|---|---|---|---|---|---|
| 1 | California | L.B. Harbor | L.B.O.D | Z-2 | Terminal | 40 | 10 | 35 |
| 2 | do | do | L.B.O.D | Z-2 | Ranger | 25 | 0 | 18 |
| 3 | do | do | Richfield | Pier A | Tank Farm #2 Comp | 15 | 0 | 8 |
| 4 | do | Wilmington | Royalty Service | 21-5-1 | | 40 | 0 | 20 |
| 5 | do | do | Cleveland Oil | | Weis #1 | 8 | 15 | 24 |
| 6 | do | do | Union Pacific | | Tank Farm #3 Comp | 30 | 0 | 17 |
| 7 | do | Santa Maria | Tidewater Oil | Caranza | Comp | 50 | 6 | 50 |
| 8 | do | do | Signal Oil | Yelkin | Comp | 40 | 12 | 46 |
| 9 | do | South Mountain | Shell Oil | Lookout | Comp | 12 | 0 | 8 |
| 10 | do | Ramona | Texas Oil | | Kern Comp | 50 | 0 | 36 |

NOTE.—The percent free water in the well fluid is based on water which appears in the conventional centrifuge test. This is commonly interpreted as water which is loosely emulsified in contrast with water which is in the form of a tight emulsion.

In the above tests, the demulsifier is the one which exemplifies the present invention and is specified in Table VI following in which the carboxylic ester is identified in test 1AA in regard emulsion 1, in test 2AA in regard emulsion 2; in test 3AA in regard emulsion 3; in test 4AA in regard emulsion 4, etc., through and including test 10AA in regard to emulsion 10. Note that the ratio of demulsifier is that specified in the particular tests above noted, i.e., 1AA, 2AA, 3AA, etc.

*Table VI*

| Demulsification Test No. | Emulsion Used | Percent Demulsifier in Test Sol | Temp. of Test, °F. | Period of Agitation after adding Demulsifier | Nature of Agitation; Machine with Shaker Arm; Shakes per Min. | Ratio of Demulsifier to Well Fluid | Less than 3% B.S. and Water in separated oil and percentage of Water out at the end of— | | | | | |
|---|---|---|---|---|---|---|---|---|---|---|---|---|
| | | | | | | | 1 hr. | 2 hr. | 3 hr. | 5 hr. | 8 hr. | 10 hr. |
| 1 | 1 | 2.5 | 150 | 5 | 130 | 1/20M | | * | | | | |
| 2 | 2 | 2.5 | 150 | 5 | 130 | 1/13M | | * | | | | |
| 3 | 3 | 2.5 | 130 | 5 | 130 | 1/10M | | | | * | | |
| 4 | 4 | 2.5 | 140 | 5 | 130 | 1/10M | | | | * | | |
| 5 | 5 | 2.5 | 150 | | | 1/8M | | | | * | | |
| 6 | 6 | 2.5 | 140 | 5 | 130 | 1/20M | | | * | | | |
| 7 | 7 | 2.5 | 160 | | | 1/5M | | | | | | * |
| 8 | 8 | 2.5 | 160 | | | 1/4M | | | | | | * |
| 9 | 9 | 2.5 | 130 | | | 1/8M | | | | * | | |
| 10 | 10 | | 150 | | | 1/10M | | | | * | | |

NOTE.—The asterisks in the above columns indicate the period in which selected demulsifiers of the present invention, as indicated specifically in Table VII immediately following, gave pipeline oil as above indicated. These data appear in Table VII with corresponding data in regard to the other two types of demulsifying agents.

*Table VII*

| Comparative Tests | Emulsified Oil Used | Demulsifier Used | Ratio of Demulsifier | Percent Water out at end of— | | | | | |
|---|---|---|---|---|---|---|---|---|---|
| | | | | 1 hr. | 2 hrs. | 3 hrs. | 5 hrs. | 8 hrs. | 10 hrs. |
| 1AA | 1 | E15b21 | 1 to 20M | | 35 | | | | |
| 1BB | 1 | | 1 to 18M | | | | | 32 | 32 |
| 1CC | 1 | | 1 to 15M | | | | | 16 | 16 |
| 2AA | 2 | E23b21 | 1 to 13M | | 17 | | | | |
| 2BB | 2 | | 1 to 10M | | | | 14 | 14 | 14 |
| 2CC | 2 | | 1 to 8M | | | | 10 | 13 | 15 |
| 3AA | 3 | E23a21 | 1 to 10M | | | | | 8 | |
| 3BB | 3 | | 1 to 9M | | | | | 6 | 7 |
| 3CC | 3 | | 1 to 5M | | | | | 4 | 4 |
| 4AA | 4 | E30b21 | 1 to 10M | | | | 20 | | |
| 4BB | 4 | | 1 to 10M | | | | 12 | 16 | 19 |
| 4CC | 4 | | 1 to 10M | | | | 8 | 10 | 10 |
| 5AA | 5 | E31a21 | 1 to 10M | | | | | 24 | |
| 5BB | 5 | | 1 to 8M | | | | 20 | 20 | 22 |
| 5CC | 5 | | 1 to 8M | | | | 18 | 18 | 18 |
| 6AA | 6 | L20a21 | 1 to 20M | | | 17 | | | |
| 6BB | 6 | | 1 to 20M | | | | 17 | | |
| 6CC | 6 | | 1 to 20M | | | | 10 | 10 | 10 |
| 7AA | 7 | L20b21 | 1 to 5M | | | | | | 48 |
| 7BB | 7 | | 1 to 5M | | | | | | 47 |
| 7CC | 7 | | 1 to 5M | | | | 27 | 27 | 28 |
| 8AA | 8 | L20b32 | 1 to 4M | | | | | | 47 |
| 8BB | 8 | | 1 to 4M | | | | | | 46 |
| 8CC | 8 | | | | | | | | 30 |
| 9AA | 9 | I20a21 | 1 to 8M | | | | 8 | | |
| 9BB | 9 | | 1 to 8M | | | | 5 | 5 | 6 |
| 9CC | 9 | | 1 to 5M | | | | 1 | 1 | 1 |
| 10AA | 10 | I20b32 | 1 to 10M | | | | 36 | | |
| 10BB | 10 | | 1 to 8M | | | | 30 | 32 | 33 |
| 10CC | 10 | | 1 to 5M | | | | 10 | 11 | 11 |

In examining the data in Table VII above it will be noted in numerous instances where the suffix BB series or suffix CC series are employed the water out is shown at more than one time interval. Thus, it illustrates in some instances that the emulsion dropped a certain amount of water, perhaps a major proportion of the total water present, and would not drop any more. The amount dropped by either the suffix BB or suffix CC series can be readily compared by the amount dropped by the AA series. Note in some cases even where all the water did not drop notwithstanding the fact the percentage of demulsifier employed was greater than in the comparable test employing the same emulsion in the suffix AA series.

In considering the results of Table VII above, it should be remembered that in California "pipeline oil" (oil acceptable to the pipelines) may contain as much as 3% emulsion and free water. In all the tests shown in the table, the reagents of the present class tested all yielded pipeline oil. In very few instances did the unesterified oxyethylated polypropyleneglycols yield pipeline oil, even at richer ratios and even if settled for longer periods of time. The esters of the non-oxyethylated polypropyleneglycols as will be noted, did give pipeline oil; but they invariably required a larger proportion of reagent to accomplish this, and did so only in a longer period of settling time. In general, it is believed the foregoing tests show the reagents of the present class were at least 20%–25% better and in some cases 50% better, than the corresponding oxyethylated polypropyleneglycol and invariably 15%–25% better than the corresponding esters of the non-oxyethylated polypropyleneglycol.

PART 4

The results obtained on a wide variety of California oils are not exceptional for this class of demulsifier and, as a matter of fact, comparable results have been obtained on various oils in the other areas.

The data immediately following represents tests on oils outside of the California area and is presented in the same manner as in Tables V, VI and VII. The tables immediately following are Nos. VIII, IX, and X.

*Table VIII*

| Emulsion No. | State of— | Oil Field | Oil Company | Lease | Percent Emulsion in Fluid from Well | Percent [1] Free Water in Fluid from Well | Percent Water Obtainable by Complete Demulsification |
|---|---|---|---|---|---|---|---|
| 1 | Oklahoma | West Edmond | Phillips Pet | Wilcox | 5 | 46 | 50 |
| 2 | do | Short Junction | Continental Oil | | 24 | 4 | 18 |
| 3 | do | Freeny | Sunray Mid-Continent | | 4 | | 3 |
| 4 | do | Water-100 | do | | 7 | | 5 |
| 5 | do | West Edmond | Powel Briscoe, Inc | | 8 | | 5 |
| 6 | do | North Luther | Chapman Pipe & Supply | Kimes | 0.8 | 32 | 33 |
| 7 | do | Faraker | O. H. Parker Pet | Adams | 16 | 6 | 16 |
| 8 | do | Ceres | Leland Fikes | Plumley | 2 | | 2 |
| 9 | do | Atlantic | Ed Cleminshire | | 4 | 1.6 | 5 |
| 10 | do | Tonkawa | Lion Oil Co | Ella | 4 | 2 | 6 |
| 11 | do | do | Davis Oil Co | State #2 | 0.8 | 16 | 2 |
| 12 | do | Pawkuska | B. R. Albert | Kennedy | | | |

[1] See what is said in the note following Table V in regard to the significance of ratio of free water.

Table IX

| Demulsification Test No. | Emulsion Used | Percent Demulsifier in Test Soln. | Temp of Test, °F. | Period of Agitation After Adding Demulsifier | Nature of Agitation; Machine with Shaker Arm; Shakes per Min. | Ratio of Demulsifier to Well Fluid | Less than 3% B.S. and Water in separated oil and percentage of Water out at the end of— | | | | | |
|---|---|---|---|---|---|---|---|---|---|---|---|---|
| | | | | | | | 1 hr. | 2 hr. | 3 hr. | 5 hr. | 8 hr. | 10 hr. |
| 1 | 1 | 2.5 | 125 | 3 | 130 | 1/25M | | | | 50 | | |
| 2 | 2 | 2.5 | 130 | 3 | 130 | 1/21M | | | 18 | | | |
| 3 | 3 | 2.5 | (¹) | 3 | 130 | 1/7.5M | | | 3 | | | |
| 4 | 4 | 2.5 | 125 | 3 | 130 | 1/8.4M | | | | 5 | | |
| 5 | 5 | 2.5 | 125 | 3 | 130 | 1/10M | | | | | 2 | |
| 6 | 6 | 2.5 | 135 | 3 | 130 | 1/6.5M | | | 5 | | | |
| 7 | 7 | 2.5 | 140 | 3 | 130 | 1/4.2M | | 33 | | | | |
| 8 | 8 | 2.5 | (¹) | 3 | 130 | 1/5.5M | | | 16 | | | |
| 9 | 9 | 2.5 | (¹) | 3 | 130 | 1/5M | | | 2 | | | |
| 10 | 10 | 2.5 | (¹) | 3 | 130 | 1/10M | | | | 5 | | |
| 11 | 11 | 2.5 | 180 | 3 | 130 | 1/2.5M | | | | 6 | | |
| 12 | 12 | 2.5 | 140 | 3 | 130 | 1/5M | | | 2 | | | |

¹ Well Temp.

Table X

| Comparative Tests | Emulsified Oil Used | Demulsifier Used | Ratio of Demulsifier | Percent water out at end of— | | | | | |
|---|---|---|---|---|---|---|---|---|---|
| | | | | 1 hr. | 2 hrs. | 3 hrs. | 5 hrs. | 8 hrs. | 10 hrs. |
| 1AA | 1 | E15b21 | 1/25M | | | | 50 | | |
| 1BB | 1 | | 1/20M | | | | 38 | 44 | 48 |
| 1CC | 1 | | 1/10M | | | | 28 | 28 | 28 |
| 2AA | 2 | E23b21 | 1/20.0M | | | 28 | | | |
| 2BB | 2 | | 1/16M | | | 18 | 17 | 17 | 18 |
| 2CC | 2 | | 1/12M | | | 16 | 15 | 15 | 15 |
| 3AA | 3 | E23a21 | 1/7.5M | | | 12 | | | |
| 3BB | 3 | | 1/6M | | | 3 | 2 | 2.5 | 3 |
| 3CC | 3 | | 1/5M | | | 2 | | 1 | 1 |
| 4AA | 4 | I20a21 | 1/8.4M | | | | 5 | | |
| 4BB | 4 | | 1/7M | | | | 4.5 | 4.5 | 5 |
| 4CC | 4 | | 1/4M | | | 3 | 3 | 3 | 3 |
| 5AA | 5 | I20b32 | 1/16M | | | | | 2 | |
| 5BB | 5 | | 1/15 | | | Trace | Trace | 1 | |
| 5CC | 5 | | 1/8M | | | Trace | Trace | 1− | 1− |
| 6AA | 6 | L20b21 | 1/65M | | | 5 | | | |
| 6BB | 6 | | 1/6.5M | | | 4 | 4.5 | 4.5 | 5 |
| 6CC | 6 | | 1/3M | | | 2 | 2 | 3 | |
| 7AA | 7 | L20a21 | 1/4.2M | | 33 | | | | |
| 7BB | 7 | | 1/4.2M | | 26 | 29 | 28 | 30 | 31 |
| 7CC | 7 | | 1/2M | | 20 | 24 | 26 | 26 | 26 |
| 8AA | 8 | E30a21 | 1/5.5M | | 16 | | | | |
| 8BB | 8 | | 1/5.5M | | | 12 | 12 | 14 | |
| 8CC | 8 | | 1/3M | | 8 | 9 | | | |
| 9AA | 9 | E30b21 | 1/5M | | | 2 | | | |
| 9BB | 9 | | 1/4.5M | | | | 1 | 1 | 1+ |
| 9CC | 9 | | 1/3M | | | | 1− | 1− | |
| 10AA | 10 | L20b32 | 1/10M | | | | 5 | | |
| 10BB | 10 | | 1/8M | | | | | 4 | 4 |
| 10CC | 10 | | 1/6M | | | | | | 3 |
| 11AA | 11 | E23b21 | 1/2.5M | | | | 6 | | |
| 11BB | 11 | | 1/2.5M | | | | | 6− | 6− |
| 11CC | 11 | | 1/1.5M | | | | 3 | 3 | |
| 12AA | 12 | E23a21 | 1/5M | | | 2 | | | |
| 12BB | 12 | | 1/4M | | | | 1.5 | 1.5 | 1.5 |
| 12CC | 12 | | 1/3M | | | | | 1− | 1− |

The above data has been presented in substantially the same manner as in Tables V, VI and VII. In Table VIII there is no reference to a particular well because in practically all cases the emulsion was obtained at a point in the system after the fluid from several wells had entered a manifold.

Data of the kind above presented is from oils which are found in the State of Oklahoma. Similar tests have been obtained from oils in Texas and the Rocky Mountain area. In considering the above results of Table IX it is to be noted that in Oklahoma the maximum amount of B.S. & W. is generally .5 or less.

In all the tests noted compounds characterized by the suffix AA gave oil within pipeline limits. Here, again, as in the tests in California there were very few instances where there was any evidence that the unesterified oxyethylated propyleneglycol would yield pipeline oil, even if higher ratios had been used, and even if settling was for a longer period of time. In some instances under such circumstances pipeline oil could be obtained but at a definitely higher temperature than any of the temperatures recorded in Table IX.

The esters of the non-oxyethylated polypropyleneglycols did yield pipeline oil in a number of instances. In such instances it was necessary to use an increased amount of demulsifier and also generally a longer settling time. In some instances even at an increased ratio of demulsifier and even with a longer settling time pipeline oil was not obtained.

The conclusions in a general way are the same as in California, to wit, it is believed specific tests show that the reagents of the present class were at least 20% to 25% better in some cases, 50% better than the corresponding oxyethylated polypropyleneglycol, and by and large approximately 15% to 25%, or at least 15% to 20%, better than the corresponding esters of the non-oxyethylated polypropyleneglycols.

PART 5

As to the use of conventional demulsifying agents, reference is made to U.S. Patent 2,626,929, dated January 27, 1953, to De Groote, and particularly to Part 3. Everything that appears therein applies with equal force and effect to the instant process, noting only that where reference is made to Example 13b in said text beginning in column 15 and ending in column 18, reference is made to the product previously identified as Example E23a21, herein.

Previous reference has been made to the fact that a large number of oxyethylated polypropyleneglycols suitable for use as reactants in the esterification reaction can be purchased from at least one company. Additionally, there appears to be at least two companies which will prepare oxyalkylation products to specification and thus are in a position to furnish oxyethylated polypropyleneglycol not generally available in the open market.

Having thus described my invention what I claim as new and desire to obtain by Letters Patent is:

1. A process for breaking petroleum emulsions of the water-in-oil type characterized by subjecting the emulsion to the action of a demulsifier including acidic esters derived by reaction between dicarboxy acids having not more than 8 carbon atoms and oxyethylated polypropyleneglycols; said oxyethylated polypropyleneglycols being derived by the oxyethylation of polypropyleneglycols having molecular weights between about 2,000 and 6,000; the amount of ethylene oxide combined by the oxyethylation step being from about 15% to about 45% of the polypropyleneglycol, by weight; the ratio of dicarboxy acid to such diol being within the range of ratios, 2:1 and 5:4; the esterification reaction being carried substantially to completion at a temperature above the boiling point of water and below the pyrolytic point of the reactants and the reaction products.

2. A process for breaking petroleum emulsions of the water-in-oil type characterized by subjecting the emulsion to the action of a demulsifier including acidic esters derived by reaction between dicarboxy acids having not more than 8 carbon atoms and oxyethylated polypropyleneglycols; said oxyethylated polypropyleneglycols being derived by the oxyethylation of polypropyleneglycols having molecular weights between about 2,000 and 6,000; the amount of ethylene oxide combined by the oxyethylation step being from about 15% to about 45% of the polypropyleneglycol, by weight; the said oxyethylation step being conducted so as to introduce approximately equal amounts of the ethylene oxide at each hydroxyl of the polypropylenglycol within the limits of conventional oxyethylation in the presence of an alkaline catalyst.

3. A process for breaking petroleum emulsions of the water-in-oil type characterized by subjecting the emulsion to the action of a demulsifier including acidic esters derived by reaction between dicarboxy acids having not more than 8 carbon atoms and oxyethylated polypropyleneglycols; said oxyethylated polypropyleneglycols being derived by the oxyethylation of polypropyleneglycols having molecular weights between about 2,000 and 2,500; the amount of ethylene oxide combined by the oxyethylation step being from about 15% to about 45% of the polypropyleneglycol, by weight; the said oxyethylation step being conducted so as to introduce approximately equal amounts of the ethylene oxide at each hydroxyl of the polypropylene glycol within the limits of conventional oxyethylation in the presence of an alkaline catalyst; and with the further proviso that esterification reaction does not yield polymers greater than the tetramer based on the glycol as a structural unit.

4. The process as defined in claim 3 with the proviso that the acid employed is diglycolic acid.

5. The process as defined in claim 3 with the proviso that the acid employed is maleic anhydride.

6. The process as defined in claim 3 with the proviso that the acid employed is terephthalic acid.

7. The process as defined in claim 3 with the proviso that the acid employed is adipic acid.

8. The process as defined in claim 3 with the proviso that the acid employed is phthalic anhydride.

References Cited in the file of this patent

UNITED STATES PATENTS

| | | |
|---|---|---|
| 2,562,878 | Blair | Aug. 7, 1951 |
| 2,615,853 | Kirkpatrick | Oct. 28, 1952 |
| 2,662,859 | Kirkpatrick | Dec. 15, 1953 |
| 2,754,271 | Kirkpatrick | July 10, 1956 |
| 2,790,777 | Kirkpatrick | Apr. 30, 1957 |
| 2,841,563 | Kirkpatrick et al. | July 1, 1958 |
| 2,911,434 | Kocher | Nov. 3, 1959 |
| 2,943,061 | Kirkpatrick | June 28, 1960 |
| 2,950,299 | Kirkpatrick | Aug. 23, 1960 |